United States Patent Office 3,253,005
Patented May 24, 1966

3,253,005
5,10-METHYLENE-19-NOR CORTICAL HORMONES
Lawrence H. Knox, Mexico City, Mexico, assignor to Syntex Corporation, Panama, Panama, a corporation of Panama
No Drawing. Filed Mar. 19, 1964, Ser. No. 353,243
19 Claims. (Cl. 260—397.45)

The present invention relates to certain novel cyclopentanophenanthrene derivatives and to the method for making the same.

More particularly this invention relates to certain novel 5,10-methylene-19-nor cortical hormones substituted at C–3 by lower alkyl radicals or at C–1 and C–3 by lower alkyl, alkenyl or alkinyl radicals. These compounds are represented by the following formulas:

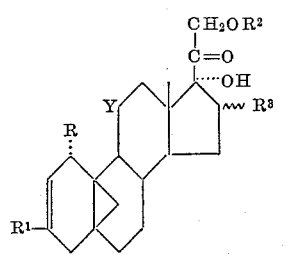

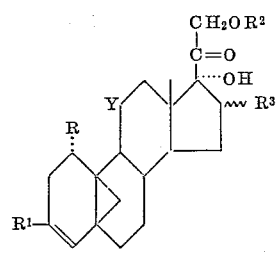

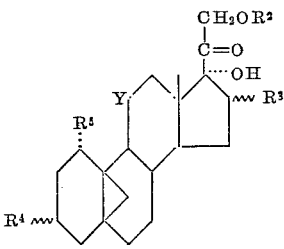

In the above formulas, R and $R^1$ represent lower alkyl, alkenyl or alkinyl radicals which may be the same or different; $R^2$ represents hydrogen or an acyl radical of less than 12 carbon atoms; $R^3$ represents hydrogen, α-methyl or β-methyl; $R^4$ represents a lower alkyl group, $R^5$ represents hydrogen or a lower alkyl group and Y represents hydrogen, keto or β-hydroxy.

The acyl groups above referred to are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds of the present invention are valuable cortical hormones with high anti-inflammatory, low catabolic, glycogenic and thymolytic activities. In addition they have anti-androgenic, antigonadotrophic and anti-estrogenic properties.

The method for producing these compounds is illustrated by the following sequence of reactions:

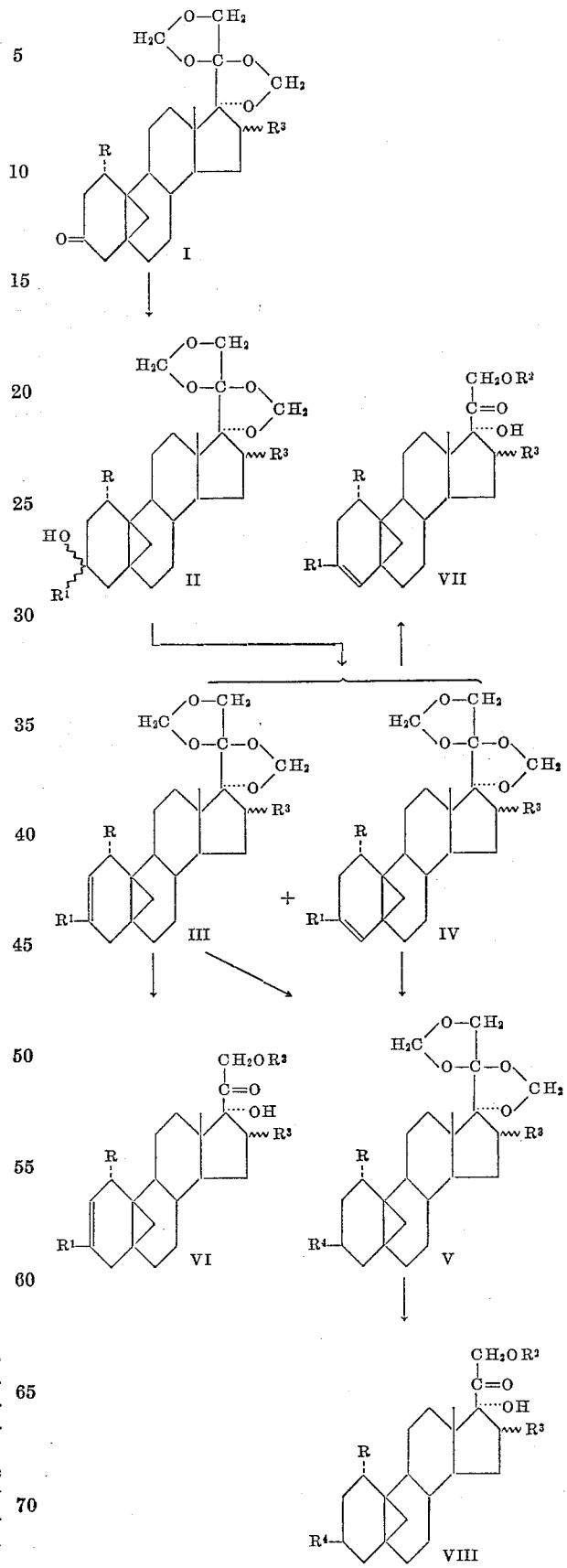

In the above formulas R, $R^1$, $R^2$, $R^3$ and $R^4$ have the same meaning as heretofore set forth.

In practicing the process illustrated above a 1α-alkyl, alkenyl or alkinyl-17,20;20,21-bismethylenedioxy-5,10-methylene-19-nor-pregnan compound (I) obtained by selective Oppenauer oxidation at C–3 of a 17,20;20,21- bismethylenedioxy-Δ⁵-pregnene-3β,19-diol to the corresponding Δ⁴-3-keto compound, reaction of this compound with 2-chloro-1,1,2-trifluorotriethylamine to produce a mixture of the 17,20;20,21-bismethylenedioxy-5,10-methylene-19-nor - Δ¹ - pregnen - 3 - one and the 17,20;20,21-bismethylenedioxy - 5,10 - seco - 5,19 - cyclo - 10β - fluoro-Δ⁴-pregnen-3-one, as described in my copending application Serial No. 286,931, filed June 11, 1963, now U.S. Pat. No. 3,184,484, and final treatment of the 17,20;20,21-bismethylenedioxy - 5,10 - methylene - 19 - nor - Δ¹-pregnen-3-one with a Grignard reagent to produce a mixture of the 1α-substituted 17,20;20,21-bismethylenedioxy-5,10-methylene - 19 - nor - pregnan - 3 - one and 3 - substituted - 5,10 - seco - 5,19 - cyclo - Δ¹⁽¹⁰⁾,²,⁴ - pregnatriene compounds, which are separated by chromatography, as described in my copending patent application Serial No. 346,074, filed Feb. 20, 1964, is treated with a lower alkyl, alkenyl or alkinyl magnesium halide such as methyl magnesium bromide, ethyl magnesium bromide, vinyl magnesium bromide, ethinyl magnesium bromide, propargyl magnesium bromide, etc., in an inert organic solvent such as ether, benzene, tetrahydrofuran, and the like, at a temperature comprised between room temperature and reflux, for a period of time of between 1 to 6 hours, to produce the corresponding 3-alkyl, alkenyl or alkinyl-3-hydroxy-17,20;20,21 - bismethylenedioxy - 5,10 - methylene - 19-nor-pregnane compounds (II). The latter compounds (II) are then dehydrated, preferably with 2-chloro-1,1,2-trifluorotriethylamine, in an inert organic solvent such as tetrahydrofuran, methylene chloride, acetonitrile, etc., at room temperature for a prolonged period of time, preferably overnight, or by using other conventional methods such as treatment with thionyl chloride in pyridine or anhydrous hydrogen chloride in acetic acid solution, to produce a mixture of the corresponding 1,3-disubstituted-Δ²-pregnenes (III) and 1,3-disubstituted Δ³-pregnenes (IV) which are separated by chromatography on Florisil or neutral alumina.

Catalytic hydrogenation of III and IV in the presence of a heavy metal catalyst, preferably in the presence of a palladium-charcoal catalyst and using a lower aliphatic alcohol as solvent, produces the saturated compounds, by absorption of 1 molar equivalent of hydrogen when R and $R^1$ are lower alkyl groups or from 2 to 5 molar equivalents when R and/or $R^1$ are alkenyl or alkinyl radicals. There are thus obtained the 1α,3-dialkyl-17,20;20,21 - bismethylenedioxy - 5,10 - methylene - 19-nor-pregnanes (V) (mixture of 3α and 3β-isomers, the latter predominating), which can be purified by fractional crystallization or chromatography. This hydrogenation is preferably conducted at room temperature and atmospheric pressure, however, these conditions are not critical.

Upon hydrolysis of the 17,20;20,21-bismethylenedioxy group in compounds III, IV and V under conventional conditions, preferably by heating with a 60% formic acid solution, the dihydroxy acetone side chain is regenerated, thus producing the 1α,3-disubstituted derivatives of 5,10-methylene-19-nor-Δ²-pregnene-17α,21-diol-20 - one, 5,10 -methylene - 19 - nor - Δ³ - pregnene - 17α, 21-diol-20-one and 5,10-methylene-19-nor-pregnane-17α, 21-diol-20-one, as well as the 16-methyl derivatives thereof (VI, VII and VIII; $R^2$=H).

The formation of the 11-oxygenated compounds are produced by microbiological oxidation as, for example, by incubation with a culture of *Curvularia lunata* and is illustrated by the following reactions:

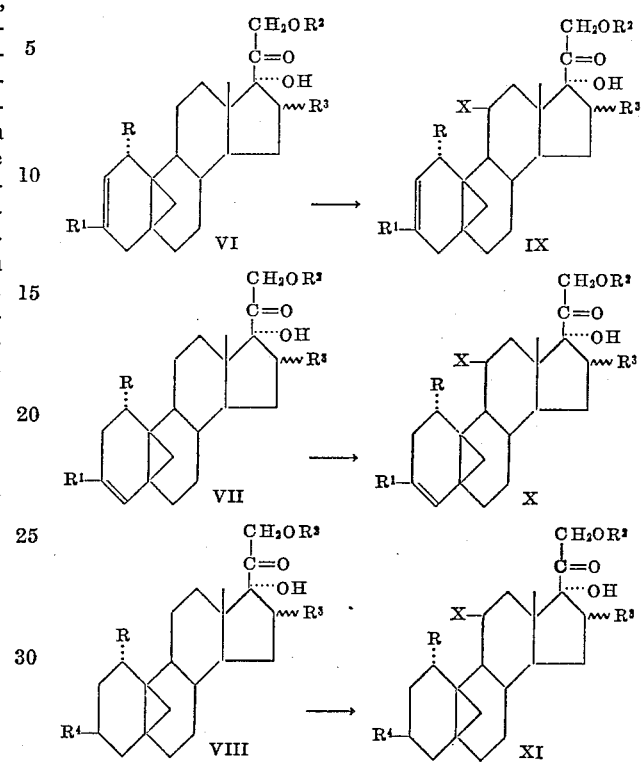

In the above formulas R, $R^1$, $R^2$, $R^3$ and $R^4$ have the same meaning as described heretofore and X represents β-hydroxy or keto.

In practicing the above reactions, compounds VI, VII and VIII are microbiologically oxidized, as by incubation with *Curvularia lunata*, to produce the corresponding 11β-hydroxy compounds, i.e., the 1α,3-disubstituted derivatives of 5,10-methylene-19-nor-Δ²-pregnene-11β,17α, 21-triol-20-one (IX: $R^2$=H; X=β-OH); the 1α,3-disubstituted derivatives of 5,10-methylene-19-nor-Δ³-pregnene-11β,17α,21-triol-20-one (X: $R^2$=H; X=β-OH); the 1α,3-disubstituted derivatives of 5,10-methylene-19-nor-Δ³-pregnene-11β,17α,21 - triol - 20 - one (X: $R^2$=H; X=β-OH) and the 1α,3-disubstituted derivatives of 5,10-methylene - 19-nor-pregnane-11β,17α,21-triol-20-one (XI: $R^2$=H; X=β-OH) as well as the 16-methyl derivatives thereof.

The above mentioned compounds having the dihydroxy acetone side chain (VI, VII, VIII, IX, X and XI; $R^2$=H) are converted into the corresponding 21-monoesters by treatment with acid anhydrides or acid chlorides of less than 12 carbon atoms in pyridine solution, in a conventional manner.

Upon oxidation of the 21-monoesters of the 11β-hydroxylated compounds (IX, X and XI; $R^2$=acyl, X=β-OH) with chromium trioxide in acetone solution or chromium trioxide in aqueous acetic acid, there are produced the respective 11-keto derivatives (IX, X and XI; $R^2$=acyl; X=keto), which can be saponified with a dilute solution of potassium hydroxide at low temperature and optionally reesterified by conventional methods.

In another aspect of the present invention illustrated by the reaction scheme below, catalytic hydrogenation of the 3-alkyl, alkenyl or alkinyl derivatives of 17,20; 20,21-bismethylenedioxy - 5,10 - seco-5,19-cyclo-Δ¹⁽¹⁰⁾,²,⁴-pregnatriene (XII) (obtained as described in the aforementioned copending application Serial No. 346,074, filed Feb. 20, 1964), using eventually the same conditions as hereinbefore described for the 1,3-disubstituted compounds, give rise to the 3α- and 3β-alkyl-5,10-methylene-19-nor-pregnanes (XIII), (the 3β-isomer predominating)

by absorption of 2 to 4 molar equivalents of hydrogen, depending on the substituent at C–3. The protecting group of the side chain is then hydrolyzed by treatment with 60% formic acid and the 3β-alkyl-5,10-methylene-19-nor-pregnane-17α,21-diol - 20 - one compounds (XIV: $R^2$=H) are incubated with a culture of *Curvularia lunata* to produce the corresponding 11β-hydroxylated compounds (XV; $R^2$=H). Conventional esterification of the above mentioned compounds give rise to the corresponding 21-monoesters (XIV and XVI; $R^2$=acyl).

Upon oxidation of the 21-monoesters of the 11β-hydroxylated compounds with chromium trioxide, there are produced the corresponding 11-keto compounds (XVI; $R^2$=acyl) which can be saponified and optionally reesterified, as previously described for the 1,3-disubstituted 5,10-methylene-19-pregnenes.

The foregoing method is illustrated by the following equations:

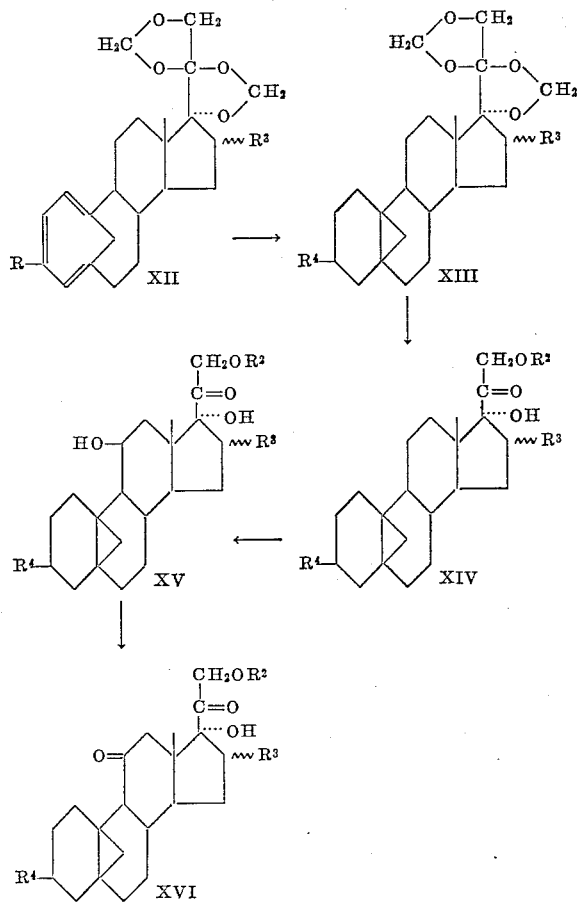

In the above formulas R, $R^2$, $R^3$ and $R^4$ have the same meaning as described heretofore.

The following examples serve to illustrate but are not intended to limit the scope of the present invention:

Example I

A solution of 2.5 g. of 1α-methyl-17,20;20,21-bismethylenedioxy-5,10-methylene-19-nor-pregnan-3-one in 95 cc. of ether was added dropwise, over a 15 minute period, to 25 cc. of 4 N-methyl-magnesium bromide solution in ether, under stirring, and the reaction mixture was stirred at room temperature under anhydrous conditions for 4 hours further. After this time it was treated carefully with saturated sodium sulfate solution and solid sodium sulfate, the inorganic material was filtered off and washed well with ether, and the filtrate evaporated to dryness. The residue was crystallized from acetone-hexane, thus affording 1α,3-dimethyl - 17,20;20,21-bismethylenedioxy-5,10-methylene-19-nor-pregnan-3-ol.

Example II

A solution of 1 g. of the foregoing compound in 7 cc. of dry pyridine was cooled to $-10°$ C., treated with 0.4 cc. of thionyl chloride and the mixture allowed to stand for 10 minutes at this temperature. Ice-water was added and the product extracted with methylene chloride. The organic extract was washed with water, hydrochloric acid solution, sodium bicarbonate solution and water to neutral, dried over anhydrous sodium sulfate and evaporated to dryness under reduced pressure. The residue was chromatographed on 50 g. of neutral alumina, thus producing 1α,3-dimethyl-17,20,20,21-bismethylenedioxy-5,10-methylene-19-nor-$\Delta^2$-pregnene and 1α,3-dimethyl-17,20;20,21-bismethylenedioxy - 5,10 - methylene-19-nor-$\Delta^3$-pregnene in pure form.

Example III

To a solution of 1 g. of 1α,3-dimethyl-17,20;20,21-bismethylenedioxy-19-nor-pregnan-3-ol in 25 cc. of anhydrous tetrahydrofuran there was added 1.5 molar equivalents of 2-chloro-1,1,2-trifluorotriethylamine, and the reaction mixture was kept at room temperature overnight. It was then evaporated to dryness under reduced pressure and the residue chromatographed on 50 g. of Florisil, to produce 1α,3-dimethyl-17,20;20,21-bismethylenedioxy-5,10-methylene-19-nor-$\Delta^2$-pregnene and 1α,3-dimethyl-17,20;20,21-bismethylenedioxy - 5,10 - methylene-19-nor-$\Delta^3$-pregnene, identical to that obtained by the method of Example II.

Example IV

By following the method of Example I, 1α,16α-dimethyl-17,20;20,21-bismethylenedioxy-5,10 - methylene-19-nor-pregnan-3-one, 1α-vinyl - 17,20;20,21-bismethylenedioxy-5,10-methylene-19-nor-pregnan-3-one and 1α-ethinyl-17,20;20,21-bismethylenedioxy-5,10-methylene - 19-nor-pregnan-3-one were converted respectively into 1α,3,16α-trimethyl-17,20;20,21-bismethylenedioxy - 5,10 - methylene-19-nor-pregnan-3-ol, 1α-vinyl-3-methyl-17,20;20,21-bismethylenedioxy-5,10-methylene-19-nor-pregnan-3-ol and 1α-ethinyl-3-methyl-17,20;20,21 - bismethylenedioxy-5,10-methylene-19-nor-pregnan-3-ol.

Upon treatment of these compounds with thionyl chloride in pyridine, in accordance with the method of Example II, there were obtained respectively: 1α,3,16α-trimethyl-17,20;20,21 - bismethylenedioxy - 5,10-methylene-19-nor-$\Delta^2$-pregnene and 1α,3,16α-trimethyl-17,20;20,21-bismethylenedioxy - 5,10-methylene-19-nor-$\Delta^3$-pregnene; 1α-vinyl-3-methyl-17,20;20,21-bismethylenedioxy-5,10-methylene-19-nor-$\Delta^2$-pregnene and 1α-vinyl-3-methyl-17,20;20,21-bismethylenedioxy - 5,10-methylene-19-nor-$\Delta^3$-pregnene and 1α-ethinyl-3-methyl-17,20;20,21-bismethylenedioxy-5,10-methylene-19-nor-$\Delta^2$ - pregnene and 1α-ethinyl-3-methyl-17,20;20,21 - bismethylenedioxy - 5,10-methylene-19-nor-$\Delta^3$-pregnene.

Example V

Into a suspension of 1 g. of 1α,3,16α-trimethyl-17,20;20,21-bismethylenedioxy-5,10 - methylene-19-nor-pregnan-3-ol in 35 g. of glacial acetic acid, there was passed a slow stream of dry hydrochloric acid; after 10 minutes all the solid material was dissolved. The gas was passed through the reaction mixture for a total of 5 hours. The solution was concentrated to about one third its initial volume by distillation under reduced pressure at 35° C., then it was poured into ice-water. The product was extracted with ether, washed to neutral, dried and evaporated to dryness. Chromatography of the residue on 50 g. of Florisil afforded 1α,3,16α-trimethyl-17,20;20, 21-bismethylenedioxy-5,10-methylene-19-nor - $\Delta^2$ - pregnene and 1α,3,16α-trimethyl-17,20;20,21-bismethylenedioxy-5,10-methylene-19-nor-$\Delta^3$-pregnene, identical to that obtained in the preceding example.

Example VI

A solution of 5 g. of 1α-methyl-17,20;20,21-bismethylenedioxy-5,10-methylene-19-nor-pregnan-3-one in 250 cc. of thiophene-free benzene was treated with 27.5 cc. of 4 N methylmagnesuim bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 1α,3-dimethyl-17,20;20,21-bismethylenedioxy-5,10-methylene-19-nor-pregnan-3-ol identical to that obtained in Example I.

By the same method, the compounds listed below under I were treated with the indicated Grignard reagent, to produce the compounds mentioned under II.

| I | Reagent | II |
|---|---|---|
| 1α-methyl-17,20;20,21-bismethylenedioxy-5,10-methylene-19-nor-pregnan-3-one. | Ethylmagnesium bromide. | 1α-methyl-3-ethyl-17,20;20,21-bismethylenedioxy-5,10-methylene-19-nor-pregnan-3-ol. |
| 1α-vinyl-17,20;20,21-bismethylenedioxy-5,10-methylene-19-nor-pregnan-3-one. | Vinyl-magnesium bromide. | 1α,3-divinyl-17,20;20,21-bismethylenedioxy-5,10-methylene-19-nor-pregnan-3-ol. |
| 1α-ethinyl-17,20;20,21-bismethylenedioxy-5,10-methylene-19-nor-pregnan-3-one. | Propyl magnesium bromide. | 1α-ethinyl-3-propyl-17,20;20,21-bismethylenedioxy-5,10-methylene-19-nor-pregnan-3-ol. |
| 1α-methyl-17,20;20,21-bismethylenedioxy-5,10-methylene-19-nor-pregnan-3-one. | Propargyl magnesium bromide. | 1α-methyl-3-propinyl-17,20;20,21-bismethylenedioxy-5,10-methylene-19-nor-pregnan-3-ol. |
| 1α,16α-dimethyl-17,20;20,21-bismethylenedioxy-5,10-methylene-19-nor-pregnan-3-one. | Ethinyl-magnesium bromide. | 1α,16α-dimethyl-3-ethinyl-17,20;20,21-bismethylenedioxy-5,10-methylene-19-nor-pregnan-3-ol. |
| 1α-ethyl-17,20;20,21-bismethylenedioxy-5,10-methylene-19-nor-pregnan-3-one. | Methyl-magnesium bromide. | 1α-ethyl-3-methyl-17,20;20,21-bismethylenedioxy-5,10-methylene-19-nor-pregnan-3-ol. |
| 1α,16β-dimethyl-17,20;20,21-bismethylenedioxy-5,10-methylene-19-nor-pregnan-3-one. | Propyl-magnesium bromide. | 1α,16β-dimethyl-3-propyl-17,20;20,21-bismethylenedioxy-5,10-methylene-19-nor-pregnan-3-ol. |
| 1α-vinyl-16β-methyl-17,20;20,21-bismethylenedioxy-5,10-methylene-19-nor-pregnan-3-one. | Ethyl-magnesium bromide. | 1α-vinyl-3-ethyl-16β-methyl-17,20;20,21-bismethylenedioxy-5,10-methylene-19-nor-pregnan-3-ol. |
| 1α-ethinyl-16α-methyl-17,20;20,21-bismethylenedioxy-5,10-methylene-19-nor-pregnan-3-one. | Propyl magnesium bromide. | 1α-ethinyl-3-propyl-16α-methyl-17,20;20,21-bismethylenedioxy-5,10-methylene-19-nor-pregnan-3-ol. |

Example VII

The compounds obtained in the preceding example were dehydrated with 2-chloro-1,1,2-trifluorotriethylamine and then chromatographed on Florisil, in accordance with the method of Example III, to produce respectively:

1α-methyl-3-ethyl-17,20;20,21-bismethylenedioxy-5,10-methylene-19-nor-Δ²-pregnene and
1α-methyl-3-ethyl-17,20;20,21-bismethylenedioxy-5,10-methylene-19-nor-Δ³-pregnene;
1α,3-divinyl-17,20;20,21-bismethylenedioxy-5,10-methlyene-19-nor-Δ²-pregnene and
1α,3-divinyl-17,20;20,21-bismethylenedioxy-5,10-methylene-19-nor-Δ³-pregnene;
1α-ethinyl-3-propyl-17,20;20,21-bismethylenedioxy-5,10-methylene-19-nor-Δ²-pregnene and
1α-ethinyl-3-propyl-17,20;20,21-bismethylenedioxy-5,10-methylene-19-nor-Δ³-pregnene;
1α-methyl-3-propinyl-17,20;20,21-bismethylenedioxy-5,10-methylene-19-nor-Δ²-pregnene and
1α-methyl-3-propinyl-17,20;20,21-bismethylenedioxy-5,10-methylene-19-nor-Δ³-pregnene;
1α,16α-dimethyl-3-ethinyl-17,20;20,21-bismethylenedioxy-5,10-methylene-19-nor-Δ²-pregnene and
1α,16α-dimethyl-3-ethinyl-17,20;20,21-bismethylenedioxy-5,10-methylene-19-nor-Δ³-pregnene;
1α-ethyl-3-methyl-17,20;20,21-bismethylenedioxy-5,10-methylene-19-nor-Δ²-pregnene and
1α-ethyl-3-methyl-17,20;20,21-bismethylenedioxy-5,10-methylene-19-nor-Δ³-pregnene;
1α,16β-dimethyl-3-propyl-17,20;20,21-bismethylenedioxy-5,10-methylene-19-nor-Δ²-pregnene and
1α,16β-dimethyl-3-propyl-17,20;20,21-bismethylenedioxy-5,10-methylene-19-nor-Δ³-pregnene;
1α-vinyl-3-ethyl-16β-methyl-17,20;20,21-bismethylenedioxy-5,10-methylene-19-nor-Δ²-pregnene and
1α-vinyl-3-ethyl-16β-methyl-17,20;20,21-bismethylenedioxy-5,10-methylene-19-nor-Δ³-pregnene;
1α-ethinyl-3-propyl-16α-methyl-17,20;20,21-bismethylenedioxy-5,10-methylene-19-nor-Δ²-pregnene and
1α-ethinyl-3-propyl-16α-methyl-17,20;20,21-bismethylenedioxy-5,10-methylene-19-nor-Δ³-pregnene.

Example VIII

A solution of 1 g. of 1α,3-dimethyl-17,20;20,21-bismethylenedioxy-5,10-methylene-19-nor-Δ²-pregnene in 100 cc. of methanol was hydrogenated in the presence of 100 mg. of 5% palladium charcoal catalyst (previously reduced) until the absorption of hydrogen ceased (1 molar equivalent). The catalyst was filtered off and the filtrate evaporated to dryness. Crystallization of the residue from acetone-ether gave the pure 1α,3β-dimethyl-17,20;20,21 - bismethylenedioxy - 5,10-methylene-19-nor-pregnane.

The same product was obtained when 1α,3-dimethyl-17,20;20,21-bismethylenedioxy-5,10 - methylene - 19-nor-Δ³-pregnene was used as starting material.

By the same method

1α,3,16α-trimethyl-17,20;20,21-bismethylenedioxy-5,10-methylene-19-nor-Δ²-pregnene,
1α-methyl-3-ethyl-17,20;20,21-bismethylenedioxy-5,10-methylene-19-nor-Δ³-pregnene and
1α-ethyl-3-methyl-17,20;20,21-bismethylenedioxy-5,10-methylene-19-nor-Δ²-pregnene were converted respectively into 1α,3β,16α-trimethyl-17,20;20,21-bismethylenedioxy-5,10-methylene-19-nor-pregnane,
1α-methyl-3β-ethyl-17,20;20,21-bismethylenedioxy-5,10-methylene-19-nor-pregnane and
1α-ethyl-3β-methyl-17,20;20,21-bismethylenedioxy-5,10-methylene-19-nor-pregnane.

Example IX

A solution of 2 g. of 1α-ethinyl-3-methyl-17,20;20,21-bismethylenedioxy - 5,10-methylene-19-nor-Δ³-pregnene in 250 cc. of ethanol was hydrogenated in the presence of 400 mg. of pre-reduced 10% palladium charcoal catalyst, until the absorption of hydrogen ceased (3 molar equivalents). The catalyst was removed by filtration and the filtrate evaporated to dryness under reduced pressure. The residue was crystallized from acetone-hexane, to produce 1α-ethyl-3β-methyl-17,20;20,21-bismethylenedioxy-5,10-methylene-19-nor-pregnane, identical to that obtained in the preceding example.

Similarly, the compounds mentioned below under I were converted into the corresponding saturated derivatives listed under II:

| I | II |
|---|---|
| 1α,3-divinyl-17,20;20,21-bismethylenedioxy-5,10-methylene-19-nor-Δ²-pregnane. | 1α,3β-dimethyl-17,20;20,21-bismethylenedioxy-5,10-methylene-19-nor-pregnane. |
| 1α-ethinyl-3-propyl-17,20;20,21-bismethylenedioxy-5,10-methylene-19-nor-Δ²-pregnene. | 1α-ethyl-3β-propyl-17,20;20,21-bismethylenedioxy-5,10-methylene-19-nor-pregnane. |
| 1α-methyl-3-propinyl-17,20;20,21-bismethylenedioxy-5,10-methylene-19-nor-Δ²-pregnene. | 1α-methyl-3β-propyl-17,20;20,21-bismethylenedioxy-5,10-methylene-19-nor-pregnane. |
| 1α,16α-dimethyl-3-ethinyl-17,20;20,21-bismethylenedioxy-5,10-methylene-19-nor-Δ³-pregnene. | 1α,16α-dimethyl-3β-ethyl-17,20;20,21-bismethylenedioxy-5,10-methylene-19-nor-pregnane. |
| 1α-ethinyl-3-propyl-16α-methyl-17,20;20,21-bismethylenedioxy-5,10-methylene-19-nor-Δ³-pregnene. | 1α-ethyl-3β-propyl-16α-methyl-17,20;20,21-bismethylenedioxy-5,10-methylene-19-nor-pregnane. |

*Example X*

In the method of the preceding example there was used 1α - 1-vinyl-3-methyl-17,20;20,21-bismethylenedioxy-5,10 - methylene - 19-nor-Δ³-pregnene as starting material, and the uptake of hydrogen was of 2 molar equivalents, thus producing 1α-ethyl-3β-methyl-17,20;20,21-bismethylenedioxy-5,10-methylene-19-nor-pregnane, identical to the obtained in Examples VIII and IX.

*Example XI*

A mixture of 1 g. of 1α,3-dimethyl-17,20;20,21-bismethylenedioxy - 5,10 - methylene-19-nor-Δ²-pregnene and 20 cc. of 60% formic acid was heated on the steam bath for 1 hour, cooled, diluted with water and the formed precipitate collected by filtration, washed with water, dried and recrystallized from acetone-hexane, thus producing 1α,3 - dimethyl - 5,10 - methylene - 19 - nor-Δ²-pregnene-17α,21-diol-20-one.

By the same method, starting from the corresponding 17,20;20,21-bismethylenedioxy derivatives obtained in the preceding examples there were produced:

1α,3-dimethyl-5,10-methylene-19-nor-Δ³-pregnene-17α,21-diol-20-one,
1α,3,16α-trimethyl-5,10-methylene-19-nor-Δ²-pregnene-17α,21-diol-20-one,
1α,3,16α-trimethyl-5,10-methylene-19-nor-Δ³-pregnene-17α,21-diol-20-one,
1α-vinyl-3-methyl-5,10-methylene-19-nor-Δ²-pregnene-17α,21-diol-20-one,
1α-vinyl-3-methyl-5,10-methylene-19-nor-Δ³-pregnene-17α,21-diol-20-one,
1α-ethinyl-3-methyl-5,10-methylene-19-nor-Δ²-pregnene-17α,21-diol-20-one,
1α-ethinyl-3-methyl-5,10-methylene-19-nor-Δ³-pregnene-17α,21-diol-20-one,
1α-methyl-3-ethyl-5,10-methylene-19-nor-Δ²-pregnene-17α,21-diol-20-one,
1α-methyl-3-ethyl-5,10-methylene-19-nor-Δ³-pregnene-17α,21-diol-20-one,
1α,3-divinyl-5,10-methylene-19-nor-Δ²-pregnene-17α,21-diol-20-one,
1α,3-divinyl-5,10-methylene-19-nor-Δ³-pregnene-17α,21-diol-20-one,
1α-ethinyl-3-propyl-5,10-methylene-19-nor-Δ²-pregnene-17α,21-diol-20-one,
1α-ethinyl-3-propyl-5,10-methylene-19-nor-Δ³-pregnene-17α,21-diol-20-one,
1α-methyl-3-propinyl-5,10-methylene-19-nor-Δ²-pregnene-17α,21-diol-20-one,
1α-methyl-3-propinyl-5,10-methylene-19-nor-Δ³-pregnene-17α,21-diol-20-one,
1α,16α-dimethyl-3-ethinyl-5,10-methylene-19-nor-Δ²-pregnene-17α,21-diol-20-one,
1α,16α-dimethyl-3-ethinyl-5,10-methylene-19-nor-Δ³-pregnene-17α,21-diol-20-one,
1α-ethyl-3-methyl-5,10-methylene-19-nor-Δ²-pregnene-17α,21-diol-20-one,
1α-ethyl-3-methyl-5,10-methylene-19-nor-Δ³-pregnene-17α,21-diol-20-one,
1α,16β-dimethyl-3-propyl-5,10-methylene-19-nor-Δ²-pregnene-17α,21-diol-20-one,
1α,16β-dimethyl-3-propyl-5,10-methylene-19-nor-Δ³-pregnene-17α,21-diol-20-one,
1α-vinyl-3-ethyl-16β-methyl-5,10-methylene-19-nor-Δ²-pregnene-17α,21-diol-20-one,
1α-vinyl-3-ethyl-16β-methyl-5,10-methylene-19-nor-Δ³-pregnene-17α,21-diol-20-one,
1α-ethinyl-3-propyl-16α-methyl-5,10-methylene-19-nor-Δ²-pregnene-17α,21-diol-20-one,
1α-ethinyl-3-propyl-16α-methyl-5,10-methylene-19-nor-Δ³-pregnene-17α,21-diol-20-one,
1α,3β-dimethyl-5,10-methylene-19-nor-pregnane-17α,21-diol-20-one,
1α,3β,16α-trimethyl-5,10-methylene-19-nor-pregnane-17α,21-diol-20-one,
1α-methyl-3β-ethyl-5,10-methylene-19-nor-pregnane-17α,21-diol-20-one,
1α-ethyl-3β-methyl-5,10-methylene-19-nor-pregnane-17α,21-diol-20-one,
1α,3β-diethyl-5,10-methylene-19-nor-pregnane-17α,21-diol-20-one,
1α-ethyl-3β-propyl-5,10-methylene-19-nor-pregnane-17α,21-diol-20-one,
1α-methyl-3β-propyl-5,10-methylene-19-nor-pregnane-17α,21-diol-20-one,
1α,16α-dimethyl-3β-ethyl-5,10-methylene-19-nor-pregnane-17α,21-diol-20-one and
1α-ethyl-3β-propyl-16α-methyl-5,10-methylene-19-nor-pregnane-17α,21-diol-20-one.

*Example XII*

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | |
|---|---|
| Glucose _____g__ | 20 |
| $(NH_4)_2HPO_4$ _____g__ | 5 |
| or | |
| $NaNO_3$ _____g__ | 3 |
| $K_2HPO_4$ _____g__ | 1 |
| $MgSO_4 \cdot 7H_2O$ _____g__ | 0.2 |
| KCl _____g__ | 0.5 |
| $ZnSO_4$ _____ | Traces |
| $FeSO_4 \cdot 7H_2O$ _____ | Traces |

Distilled water to complete 1 lt.

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 1α,3 - dimethyl - 5,10 - methylene - 19 - nor-Δ³-pregnene-17α,21-diol-20-one in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 12 g. of silica gel and eluted with methylene chloride-acetone (9:1) to produce 1α,3-dimethyl-5,10-methylene - 19 - nor - Δ³ - pregnene - 11β,17α,21 - triol-20-one.

By the same method the compounds mentioned below under I were converted into the corresponding 11β-hydroxylated derivatives (II):

| I | II |
|---|---|
| 1α,3,16α-trimethyl-5,10-methylene-19-nor-Δ³-pregnene-17α,21-diol-20-one. | 1α,3,16α-trimethyl-5,10-methylene-19-nor-Δ³-pregnene-11β,17α,21-triol-20-one. |
| 1α-ethinyl-3-methyl-5,10-methylene-19-nor-Δ³-pregnene-17α,21-diol-20-one. | 1α-ethinyl-3-methyl-5,10-methylene-19-nor-Δ³-pregnene-11β,17α,21-triol-20-one. |
| 1α,3-divinyl-5,10-methylene-19-nor-Δ²-pregnene-17α,21-diol-20-one. | 1α,3-divinyl-5,10-methylene-19-nor-Δ²-pregnene-11β,17α,21-triol-20-one. |
| 1α,3,16α-trimethyl-5,10-methylene-19-nor-Δ²-pregnene-17α,21-diol-20-one. | 1α,3,16α-trimethyl-5,10-methylene-19-nor-Δ²-pregnene-11β,17α,21-triol-20-one. |
| 1α,16α-dimethyl-3-ethinyl-5,10-methylene-19-nor-Δ²-pregnene-17α,21-diol-20-one. | 1α,16α-dimethyl-3-ethinyl-5,10-methylene-19-nor-Δ²-pregnene-11β,17α,21-triol-20-one. |
| 1α-ethyl-3-methyl-5,10-methylene-19-nor-Δ²-pregnene-17α,21-diol-20-one. | 1α-ethyl-3-methyl-5,10-methylene-19-nor-Δ²-pregnene-11β,17α,21-triol-20-one. |
| 1α,3β-dimethyl-5,10-methylene-19-nor-pregnane-17α,21-diol-20-one. | 1α,3β-dimethyl-5,10-methylene-19-nor-pregnane-11β,17α,21-triol-20-one. |
| 1α,3β,16α-trimethyl-5,10-methylene-19-nor-pregnane-17α,21-diol-20-one. | 1α,3β,16α-trimethyl-5,10-methylene-19-nor-pregnane-11β,17α,21-triol-20-one. |
| 1α-methyl-3β-propyl-5,10-methylene-19-nor-pregnane-17α,21-diol-20-one. | 1α-methyl-3β-propyl-5,10-methylene-19-nor-pregnane-11β,17α,21-triol-20-one. |

*Example XIII*

A mixture of 1 g. of 1α,3-dimethyl-5,10-methylene-19-nor-Δ³-pregnene-11β,17α,21-triol-20-one, 4 cc. of pyridine and 2 cc. of acetic anhydride was kept at room temperature overnight, poured into ice water, the formed precipitate was filtered, washed with water and dried. Crystallization from acetone-hexane gave the 21-monoacetate of 1α,3 - dimethyl - 5,10 - methylene - 19 - nor - Δ³-pregnene-11β,17α,21-triol-20-one.

By the same method, all the compounds obtained in the preceding example were converted into the corresponding 21-monoacetates.

*Example XIV*

A solution of 500 mg. of the 21-monoacetate of 1α,3-dimethyl - 5,10 - methylene - 19 - nor - Δ³ - pregnene-11β,17α,21-triol-20-one in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 10 minutes further at 0–5° C. and diluted with water. The precipitate was collected, washed with water and dried under vacuum, thus affording a crude product which upon recrystallization from acetone-hexane gave the 21-monoacetate of 1α,3 - dimethyl - 5,10 - methylene - 19 - nor - Δ³ - pregnene-17α,21-diol-11,20-dione.

By the same method, the 21-monoacetate of 1α-ethinyl-3 - methyl - 5,10 - methylene - 19 - nor - Δ³ - pregnene-11β, 17α,21 - triol - 20 - one, the 21 - monoacetate of 1α,3 - divinyl - 5,10 - methylene - 19 - nor - Δ² - pregnene-11β,17α,21 - triol - 20 - one, the 21-monoacetate of 1α-ethyl - 3 - methyl - 5,10 - methylene - 19 - nor - Δ² - pregnene-11β,17α,21-triol-20-one and the 21-monoacetate of 1α,3β - dimethyl - 5,10 - methylene - 19 - nor - pregnane-11β,17α,21-triol-20-one were converted respectively into the 21-monoacetate of 1α-ethinyl-3-methyl-5,10-methylene-19-nor-Δ³-pregnene-17α,21-diol-11,20-dione, the 21-monoacetate of 1α,3 - divinyl - 5,10 - methylene - 19-nor - Δ² - pregnene - 17α,21 - diol - 11,20 - dione, the 21-monoacetate of 1α - ethyl - 3 - methyl - 5,10 - methylene-19-nor-Δ²-pregnene-17α,21-diol-11,20-dione and the 21-monoacetate of 1α,3β - dimethyl - 5,10 - methylene - 19-nor-pregnane-17α,21-diol-11,20-dione.

*Example XV*

A solution of 1 g. of 3-methyl-17,20;20,21-bismethylenedioxy-5,10-seco-5,19-cyclo-Δ¹⁽¹⁰⁾,²,⁴-pregnatriene in 75 cc. of ethanol was added to a suspension of 300 mg. of a 10% palladium on charcoal catalyst in 10 cc. of ethanol, which had been previously reduced. The mixture was hydrogenated at room temperature, at atmospheric pressure, until the absorption of hydrogen ceased (approximately 2 molar equivalents of hydrogen were absorbed). The catalyst was removed by filtration, and the filtrate evaporated to dryness under reduced pressure. The residue was crystallized from acetone-ether, to produce 3β - methyl - 17,20;20,21 - bismethylenedioxy - 5,10-methylene-19-nor-pregnane.

Upon hydrolysis of the foregoing compound with 60% formic acid, in accordance with the method of Example XI there was obtained 3β-methyl-5,10-methylene-19-nor-pregnane-17α,21-diol-20-one.

In a similar manner, starting from 3,16α-dimethyl-17,20;20,21 - bismethylenedioxy - 5,10 - seco - 5,19-cyclo-Δ¹⁽¹⁰⁾,²,⁴-pregnatriene there were obtained successively 3α,16α - dimethyl - 17,20;20,21 - bismethylenedioxy - 5,10 - methylene - 19 - nor - pregnane and 3β,16α-dimethyl - 5,10 - methylene - 19 - nor - pregnane - 17α,21-diol-20-one.

*Example XVI*

The preceding example was repeated but using 3-vinyl-17,20;20,21 - bismethylenedioxy - 5,10 - seco - 5,19-cyclo-Δ¹⁽¹⁰⁾,²,⁴-pregnatriene as starting material, in this case there were consumed approximately 3 molar equivalents of hydrogen. There was produced as final product 3β - ethyl - 5,10 - methylene - 19 - nor - pregnane-17α,21-diol-20-one.

*Example XVII*

Example XV was repeated but 3-ethinyl-17,20;20,21-bismethylenedioxy - 5,10 - seco - 5,19 - cyclo - Δ¹⁽⁰⁾,²,⁴-pregnatriene was used as starting material and the uptake of hydrogen was of approximately 4 molar equivalents. Upon hydrolysis of the bismethylenedioxy grouping there was obtained 3β-ethyl-5,10-methylene-19-nor-pregnane-17α,21-diol-20-one identical to that obtained in the preceding example.

*Example XVIII*

In accordance with the method of Example XII, 3β-methyl - 5,10 - methylene - 19 - nor - pregnane - 17α,21-diol - 20 - one, 3β,16α - dimethyl - 5,10 - methylene - 19-nor - pregnane - 17α,21 - diol - 20 - one and 3β - ethyl-5,10-methylene-19-nor-pregnane-17α,21-diol-20-one were incubated with a culture of *Curvularia lunata* ATCC 13935, to produce respectively 3β-methyl-5,10-methylene-19 - nor - pregnane - 11β,17α,21 - triol - 20 - one, 3β,16α- dimethyl - 5,10 - methylene - 19 - nor - pregnane - 11β,-17α,21 - triol - 20 - one and 3β - ethyl - 5,10 - methylene-19-nor-pregnane-11β,17α,21-triol-20-one.

These 11β-hydroxylated compounds were esterified with acetic, caproic and cyclopentylpropionic anhydrides, thus producing the corresponding 21-monoacetates, 21-monocaproates and 21-monocyclopentylproprionates.

21-diol-11,20-dione were converted into the corresponding free compounds.

*Example XXI*

In accordance with the method of Example XIII, the compounds mentioned below under I were esterified with the indicated acid anhydride, to produce the corresponding esters (II):

| I | Anhydride | II |
|---|---|---|
| 1α,3-dimethyl-5,10-methylene-19-nor-Δ²-pregnene-17α,21-diol-20-one. | Caproic | 21-monocaproate of 1α,3-dimethyl-5,10-methylene-19-nor-Δ²-pregnene-17α,21-diol-20-one. |
| 1α,3,16α-trimethyl-5,10-methylene-19-nor-Δ²-pregnene-17α,21-diol-20-one. | Propionic | 21-monopropionate of 1α,3,16α-trimethyl-5,10-methylene-19-nor-Δ²-pregnene-17α,21-diol-20-one. |
| 1α,3-dimethyl-5,10-methylene-19-nor-Δ²-pregnene-11β,17α,21-triol-20-one. | Undecenoic | 21-monoundecenoate of 1α,3-dimethyl-5,10-methylene-19-nor-Δ²-pregnene-11β,17α,21-triol-20-one. |
| 1α-ethinyl-3-methyl-5,10-methylene-19-nor-Δ³-pregnene-17α,21-diol-20-one. | Enanthic | 21-monoenanthate of 1α-ethinyl-3-methyl-5,10-methylene-19-nor-Δ³-pregnene-17α,21-diol-20-one. |
| 1α,3-divinyl-5,10-methylene-19-nor-Δ³-pregnene-17α,21-diol-20-one. | Caproic | 21-monocaproate of 1α,3-divinyl-5,10-methylene-19-nor-Δ³-pregnene-17α,21-diol-20-one. |
| 1α-ethinyl-3-propyl-16α-methyl-5,10-methylene-19-nor-Δ³-pregnene-17α,21-diol-20-one. | Cyclopentyl propionic. | 21-monocyclopentylpropionate of 1α-ethinyl-3-propyl-16α-methyl-5,10-methylene-19-nor-Δ³-pregnene-17α,21-diol-20-one. |
| 1α,3β-16α-trimethyl-5,10-methylene-19-nor-pregnane-17α,21-diol-20-one. | Propionic | 21-monopropionate of 1α,3β,16α-trimethyl-5,10-methylene-19-nor-pregnane-17α,21-diol-20-one. |
| 1α-ethyl-3-methyl-5,10-methylene-19-nor-Δ²-pregnene-11β,17α,21-triol-20-one. | Undecenoic | 21-monoundecenoate of 1α-ethyl-3-methyl-5,10-methylene-19-nor-Δ²-pregnene-11β,17α,21-triol-20-one. |
| 1α-methyl-3β-propyl-5,10-methylene-19-nor-pregnane-11β,17α,21-triol-20-one. | Enanthic | 21-monoenanthate of 1α-methyl-3β-propyl-5,10-methylene-19-nor-pregnane-11β,17α,21-triol-20-one. |
| 1α-ethinyl-3-methyl-5,10-methylene-19-nor-Δ³-pregnene-17α,21-diol-11,20-dione. | Caproic | 21-monocaproate of 1α-ethinyl-3-methyl-5,10-methylene-19-nor-Δ³-pregnene-17α,21-diol-11,20-dione. |
| 1α,3-dimethyl-5,10-methylene-19-nor-Δ³-pregnene-17α,21-diol-11,20-dione. | Cyclopentyl propionic. | 21-monocyclopentylpropionate of 1α,3-dimethyl-5,10-methylene-19-nor-Δ³-pregnene-17α,21-diol-11,20-dione. |

*Example XIX*

In accordance with the method described in Example XIV the 21-monoacetate of 3β-methyl-5,10-methylene-19 - nor - pregnane - 11β,17α,21 - triol - 20 - one, the 21-monocaproate of 3β,16α - dimethyl - 5,10 - methylene-19 - nor - pregnane - 11β,17α,21 - triol - 20 - one and the 21-monocyclopentylpropionate of 3β-ethyl-5,10-methylene - 19 - nor - pregnane - 11β,17α,21 - triol - 20 - one were converted respectively into the 21-monoacetate of 3β - methyl - 5,10 - methylene - 19 - nor - pregnane-17α,21 - diol - 11,20 - dione, the 21 - monocaproate of 3β,16α - dimethyl - 5,10 - methylene - 19 - nor - pregnane-17α,21 - diol - 11,20 - dione and the 21 - monocyclopentylpropionate of 3β - ethyl - 5,10 - methylene - 19-nor-pregnane-17α,21-diol-11,20-dione.

*Example XX*

A solution of 500 mg. of the 21-monoacetate of 1α,3-dimethyl-5,10-methylene-19-nor-Δ³ - pregnene - 17α,21-diol-11,20-dione in 15 cc. of methanol was cooled to 0° C. and treated under nitrogen atmosphere with 1.5 cc. of a 4% aqueous solution of potassium hydroxide and the reaction mixture was stirred for 1 hour under an atmosphere of nitrogen at 0° C.; it was then neutralized with acetic acid and the methanol distilled under reduced pressure. The residue was triturated with water and the solid collected, washed with water, dried and recrystallized from ethyl acetate-methanol, thus producing 1α,3-dimethyl-5,10-methylene-19-nor-Δ³-pregnene - 17α,21 - diol-11,20-dione.

In a similar manner, the 21-monoacetate of 1α-ethinyl-3-methyl-5,10-methylene - 19 - nor-Δ³ - pregnene-17α,21-diol-11,20-dione, the 21-monoacetate of 1α,3-divinyl-5,10-methylene-19-nor-Δ²-pregnene-17α,21 - diol - 11,20-dione, the 21-monoacetate of 1α-ethyl-3-methyl - 5,10-methylene - 19 - nor-Δ²-pregnene-17α,21-diol-11,20-dione, the 21-monoacetate of 1α,3β-dimethyl - 5,10 - methylene-19-nor-pregnane-17α-21 - diol-11,20-dione, the 21-monoacetate of 3β-methyl-5,10-methylene-19 - nor - pregnane-17α,21-diol - 11,20 - dione and the 21-monocaproate of 3β,16α-dimethyl - 5,10-methylene-19-nor-pregnane - 17α,

I claim:
1. A compound of the following formula:

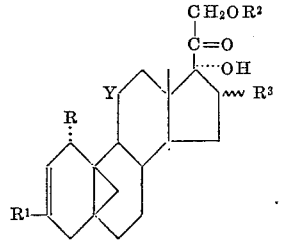

wherein R and R¹ are selected from the group consisting of lower alkyl, lower alkenyl and lower alkinyl; R² is selected from the group consisting of hydrogen and a hydrocarbon carboxylic acyl group of less than 12 carbon atoms; R³ is selected from the group consisting of hydrogen, α-methyl and β-methyl and Y is selected from the group consisting of hydrogen, β-hydroxy and keto.

2. 1α,3-dimethyl-5,10-methylene-19-nor-Δ² - pregnene-17α,21-diol-20-one.

3. 1α,3,16α-trimethyl-5,10 - methylene - 19 - nor - Δ²-pregnene-17α,21-diol-20-one.

4. 1α-vinyl - 3 - methyl - 5,10 - methylene - 19 - nor-Δ²-pregnene 17α,21-diol - 20 - one.

5. 1α-ethyl - 3 - methyl - 5,10-methylene - 19 - nor-Δ²-pregnene-11β,17α-21-triol-20-one.

6. 1α,3,16α - trimethyl - 5,10-methylene-19-nor-Δ²-pregnene- 17α,21-diol-11,20-dione.

7. A compound of the following formula:

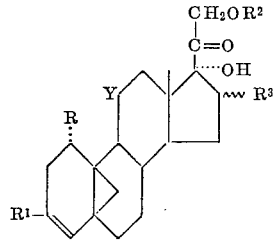

wherein R and R¹ are selected from the group consisting of lower alkyl, lower alkenyl and lower alkinyl; R² is selected from the group consisting of hydrogen and a hydrocarbon carboxylic acyl group of less than 12 carbon atoms; R³ is selected from the group consisting of hydrogen, α-methyl and β-methyl and Y is selected from the group consisting of hydrogen, β-hydroxy and keto.

8. 1α,3-dimethyl - 5,10-methylene-19-nor-Δ³-pregnene-17α,21-diol-20-one.

9. 1α,3,16α-trimethyl - 5,10-methylene-19-nor-Δ³-pregnene-17α,21-diol-20-one.

10. 1α,3 - dimethyl - 5,10 - methylene-19-nor-Δ³-pregnene-17α,21-diol-11,20-dione.

11. 1α,3,16α - trimethyl - 5,10 - methylene-19-nor-Δ³-pregnene-11β,17α,21-triol-20-one.

12. A compound of the following formula:

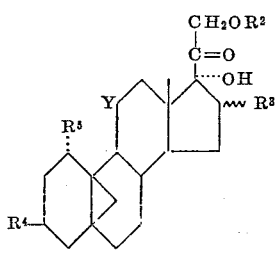

wherein R² is selected from the group consisting of hydrogen and a hydrocarbon carboxylic acyl group of less than 12 carbon atoms; R³ is selected from the group consisting of hydrogen, α-methyl and β-methyl and Y is selected from the group consisting of hydrogen, β-hydroxy and keto; R⁴ represents a lower alkyl group and R⁵ is selected from the group consisting of hydrogen and lower alkyl.

13. 1α,3β - dimethyl - 5,10 - methylene-19-nor-pregnane-17α,21-diol-20-one.

14. 1α,3β,16α-trimethyl - 5,10 - methylene-19-nor-pregnane-11β,17α,21-triol-20-one.

15. 1α,3β - dimethyl - 5,10 - methylene-19-nor-pregnane-17α,21-diol-11,20-dione.

16. 3β - methyl - 5,10 - methylene-19-nor-pregnane-17α,21-diol-20-one.

17. 3β - ethyl - 5,10 - methylene - 19 - nor - pregnane-11β,17α,21-triol-20-one.

18. 3β,16α - dimethyl - 5,10 - methylene-19-nor-pregnane-11β,17α,21-triol-20-one.

19. 3β,16α - dimethyl - 5,10 - methylene-19-nor-pregnane-17α,21-diol-11,20-dione.

No references cited.

LEWIS GOTTS, *Primary Examiner.*